(12) United States Patent
Spengler

(10) Patent No.: US 6,524,510 B2
(45) Date of Patent: Feb. 25, 2003

(54) METHOD AND APPARATUS FOR PRODUCING A PRECISE JOINT BETWEEN TWO COVER MATERIALS FOR A TRIM COMPONENT

(75) Inventor: Gerhard Spengler, Frankfurt (DE)

(73) Assignee: R+S Technik GmbH, Offenbach am Main (DE)

( * ) Notice: Subject to any disclaimer, the term of this patent is extended or adjusted under 35 U.S.C. 154(b) by 244 days.

(21) Appl. No.: 09/729,140

(22) Filed: Dec. 1, 2000

(65) Prior Publication Data

US 2001/0000584 A1 May 3, 2001

Related U.S. Application Data

(63) Continuation-in-part of application No. 09/176,356, filed on Oct. 21, 1998, now Pat. No. 6,214,157.

(51) Int. Cl.[7] .......................... B29C 51/14; B29C 51/26
(52) U.S. Cl. ....................... 264/248; 264/320; 425/520; 425/400; 425/397; 425/515; 156/214; 156/221; 156/222; 156/275
(58) Field of Search ................................ 625/510, 517, 625/51.5 OR, 400, 520, 394, 397; 264/266, 320, 248; 156/475, 196, 212, 214, 221, 222, 242, 245, 443

(56) References Cited

U.S. PATENT DOCUMENTS 4,861,543 A   8/1989   Rafferty ...................... 264/545
4,978,407 A * 12/1990  Ardissone ................... 156/216
5,304,273 A   4/1994   Kenrick et al. ............. 156/219
5,413,661 A   5/1995   Spengler et al. ............ 156/515
5,573,617 A   11/1996  Frank et al. ................ 156/196
5,709,925 A   1/1998   Spengler et al. ............ 428/198
5,830,518 A * 11/1998  Oda ............................ 425/517
6,261,504 B1 * 7/2001   Baker et al. ................ 264/318

FOREIGN PATENT DOCUMENTS

| DE | 4327551    | 2/1995  |
| DE | 0683030    | 11/1995 |
| EP | 0348357    | 12/1989 |
| EP | 0372355    | 6/1990  |
| GB | 2176743    | 1/1987  |
| WO | WO97/40980 | 11/1997 |

* cited by examiner

Primary Examiner—Jan H. Silbaugh
Assistant Examiner—Thu Khanh T. Nguyen
(74) Attorney, Agent, or Firm—W. F. Fasse; W. G. Fasse

(57) ABSTRACT

A trim component (1) includes a substrate (2) and two different cover materials (3, 4), which are not spliced together but are independently adhesively bonded onto the substrate (2) by a hot-melt contact adhesion. The junction (7) is received in a valley (6) of the substrate that is pinched closed using a molding apparatus that includes a horizontally movable pinching stamp (13) which forms a pinching gap (16) relative to a protruding edge (11A) of a fixed mold tool (11). A tucking blade (22) cooperates with a counter-clamping blade (26) to clampingly hold and then press the substrate and junction of the cover sheets into the pinching gap. The tucking blade is then retracted while the pinching stamp pinches closed the pinching gap, to form a tightly closed valley in the substrate with the junction cleanly pinched therein.

11 Claims, 10 Drawing Sheets

METHOD AND APPARATUS FOR PRODUCING A PRECISE JOINT BETWEEN TWO COVER MATERIALS FOR A TRIM COMPONENT

CROSS-REFERENCE TO RELATED APPLICATION

The present application is a Continuation-In-Part of U.S. application Ser. No. 09/176,356, filed Oct. 21, 1998, now U.S. Pat. No. 6,214,157 by the same inventor.

FIELD OF THE INVENTION

The invention relates to a method and an apparatus for making a trim component and especially an interior trim panel for a motor vehicle, wherein the decorative covering of the trim component includes two different cover materials.

BACKGROUND INFORMATION

In the automotive industry, it has become known to use interior trim components such as interior door panels, dashboards, and the like having a decorative covering including two different cover materials on the same trim component. Such a trim component having a two-part cover material is desired by consumers, for example to achieve a "two-tone effect" in which the two different cover materials have different colors, or a high value or "luxury effect" in which the two different cover materials are different types of materials such as a decorative cover film and a decorative cloth, or in which the different cover materials have different degrees of "soft touch" padding or the like.

In order to make such vehicle trim components having two-part cover materials, it has conventionally been the practice to splice together the two different cover materials before applying the spliced cover sheet onto the substrate of the trim component. The splicing of the two different cover materials has conventionally been carried out by thermal welding, adhesive bonding, or stitching. After the two different cover materials have been spliced together in such a manner, it is generally necessary to hide or cover the splice line in order to hide the stitching or any adhesive overspill or the like. This is conventionally achieved by applying a trim strip, such as a strip of plastic, chrome, wood or the like, over the splice line on the finished trim component. Alternatively, it has been attempted to press the splice line into a groove provided in the substrate in order to hide the splice line in this manner.

The above described conventional practices and the resulting trim component having a two-part cover material suffer many disadvantages, including the following. The preliminary process of splicing together the two different cover materials involves extra processing and handling steps, which translates into increased costs and a greater likelihood of defective parts leading to a higher reject rate. Furthermore, the application of a trim strip to hide the splice line on the finished door panel, dashboard or the like requires extra steps and extra materials, which again lead to higher costs and higher defect rates.

Most importantly, the previously known methods for making a trim component having a two-part cover material require extreme precision in forming the splice between the two different cover materials, then aligning the spliced two-part cover material onto the substrate of the trim component, and aligning the splice line with the groove provided in the substrate and/or aligning the splice trim strip with the splice line. It has been found in practice that this high degree of precision cannot be reliably attained, and as a result, the splice line is left at least partially visible in the finished trim component, i.e. the splice line protrudes out of the groove in the substrate or protrudes from under the splice trim strip. This leads to an unacceptably high reject rate of the finished trim components.

Moreover, in the operation for pressing the splice line into a groove provided in the substrate, it has been necessary to preform the groove in the substrate, which requires extra processing steps, and it has been necessary to make the groove wide enough to provide a sufficient tolerance range so that a tucking blade can press the splice line of the cover material down into the groove and then be retracted. In other words, the groove in the substrate conventionally has to be wide enough to allow for the thickness of the two layers of the cover material on both sides of the splice and for the thickness of the tucking blade that presses the cover material into the groove. After the tucking blade is retracted, however, a gap necessarily remains where the tucking blade had been pressed in. In any event, the result in the finished trim component has been unsatisfactory, because of the above mentioned defects in alignment of the splice line with the groove, but also because of the width of the conventional groove, which does not have a "closed" and "crisp" appearance.

SUMMARY OF THE INVENTION

In view of the above, it is an object of the invention to provide a trim component especially for the interior of a motor vehicle, that has a decorative covering including at least two different cover materials in which the two cover materials are not pre-spliced together, and the junction line is hidden in a groove or valley of the substrate without requiring a splice trim strip. It is a further object of the invention to provide a method and an apparatus for producing such a trim component, which avoid the need for pre-splicing operations, and which ensure that the junction line between the two cover materials is precisely positioned and received in the groove of the substrate. The invention further aims to avoid or overcome the other disadvantages of the prior art, and to achieve additional advantages, as apparent from the present description.

The above objects have been achieved in a trim component according to the invention, including a substrate, and a decorative covering including two different cover sheets, which may include cover sheets having different colors and/or cover sheets made of different materials, such as a cloth cover sheet and a film cover sheet. The film may be a synthetic leatherette film, or a vinyl film, or a thermoplastic polyolefin (TPO) film, for example. The cover sheet may include a polyolefin foam or film backing for achieving hot-melt bonding. The substrate preferably comprises natural fibers and a polyolefin material, and especially polypropylene. An example of a preferred material is a multi-layered substrate material available under the trademark "LOPREFIN" from R+S Technik GmbH of Offenbach, Germany.

The substrate includes a valley formed therein, with a junction of the two different cover sheets pressed into this valley. The two different cover sheets are not pre-spliced to each other, but instead are simply pressed into the valley as it is being formed. Particularly, the valley is formed by pinching the substrate material onto the junction area of the two different cover sheets as the substrate is being molded and laminated with the cover sheets.

The cover sheets are laminated and adhered onto the substrate due to the hot-melt adhesion effect provided by the surface of the hot substrate during the forming process. Namely, when the substrate material is heated for laminating, the polypropylene therein is softened and at least partially melted to provide a tacky adhesion for bonding the two cover sheets onto the substrate, and also into the valley of the substrate. Thus, no additional stitching or adhesive is necessary for joining the two cover sheets to each other or for bonding the cover sheets onto the substrate.

The above objects have generally further been achieved by a method according to the invention of the above-referenced parent application Ser. No. 09/176,356, now U.S. Pat. No. 6,124,157, of the present Continuation-In-Part. According to the general method which is common to the parent application and the present Continuation-In-Part, the two different cover sheets are separately laid onto a preheated substrate sheet, whereby the cover sheets adhere in a tacky manner onto the preheated substrate, by a hot-melt adhesive effect provided by the hot polypropylene. The bordering edges of the cover sheets forming the junction therebetween are then pressed down by a tucking blade from above so as to form the valley in the substrate and push the junction area of the cover sheets into the valley. Next, the valley is pinched together from below, while the tucking blade is retracted from above, so as to pinch the valley closed, whereby the junction of the two different cover sheets is held in the pinched valley.

By pinching the substrate in this manner, while pressing down from above with a tucking blade, and continuing and completing the pinching as the tucking blade is removed, it is ensured that the valley is pinched closed without leaving any gap or space resulting from the width or thickness of the tucking blade. The pinching securely adhesively fixes the bordering edges of the two different cover sheets onto the substrate in the valley, due to the tacky hot-melt adhesive effect of the hot substrate sheet, so that it is unnecessary to splice or bond the bordering edges to each other.

Since the pinching gap is initially much wider than the finished pinched valley, the degree of precision required for aligning or registering the junction line of the two different cover sheets over the pinching gap is significantly reduced. Namely, it is simply necessary to align the junction of the two cover sheets with the initially wide open gap in the molding tools used for forming the pinched valley, and when this gap is closed or pinched, the finished pinched valley is much narrower than the originally provide gap. Thus, the wider width of the initially open gap contributes to a larger tolerance for positioning the junction line of the two cover sheets, while the narrower closed gap defines the width of the finished valley pinching the cover sheet bordering edges therein.

Moreover, the depth of the pinching gap also contributes to the tolerance range for ultimately hiding the junction line of the two different cover sheet materials. By making the gap as deep and as wide as required in the initial open state of the molding tools, it is simple to provide a large tolerance for the proper positioning of the two different cover sheets onto the substrate and then positioning the substrate onto the mold, while still ensuring that the finished trim component will have a completely closed or pinched valley, with the junction of the two different cover sheets completely hidden within this valley. The resulting valley has a clean and crisp closed appearance, because the inner width of the substrate valley is not greater than the sum of the thicknesses of the two cover sheets overlapped and received in the pinched valley.

The above objects have still further been generally achieved in a forming mold apparatus according to the parent application and the present invention, including a lower mold section and an upper mold section that are generally movable vertically relative to each other. The molding apparatus further includes a slip frame that holds the edges of the substrate sheet with the cover an sheets placed thereon, and transports this prelaminated sheet into the mold and holds it under proper tension during the molding operation. The lower mold section includes a fixed base mold or fixed tool segment, a vertically movable primary lower mold stamp that is vertically movable relative to the fixed tool segment, and a pinching stamp that is horizontally movable relative to the fixed tool segment and that forms a pinching gap between a protruding edge or rim of the pinching stamp and a protruding edge or rim of the fixed tool segment. The upper mold section includes an upper primary mold stamp, a tucking blade that is vertically movable relative to the upper primary mold stamp, and an edge crimping ring that is vertically movable relative to the upper primary mold stamp.

The lower primary mold stamp cooperates with the upper primary mold stamp to form the major contours of the finished trim component therebetween. The tucking blade of the upper mold section cooperates with the pinching gap formed between the fixed tool segment and the horizontally movable pinching stamp of the lower mold section in order to form the pinched valley in the trim component, with the junction between the two different cover sheets tucked down into this closed pinched valley. The vertically movable edge crimping ring cooperates with a corresponding edge of the pinching stamp of the lower mold section to form a closed crimped edge around the outer contour of the trim component.

In practically carrying out the above described original method using the above described original apparatus according to the above referenced parent application, it has been discovered that the original method and apparatus could still be further improved. Namely, it is sometimes difficult to ensure that the junction between the two cover sheets remains precisely aligned in the valley of the substrate, even considering the range of tolerance that is afforded by this pinched valley as described above. Particularly, in practice it has been found that the two cover sheet materials adhered onto the substrate very often undergo differential slipping or differential stretching as the tucking blade of the upper mold section pushes the junction line of the two cover sheets into the pinching gap in the pinching stamp of the lower mold section.

Since the two cover sheets on the substrate are held under tension in the slip frame around the perimeter of the molding apparatus, the two cover sheets will purposely slip to some extent, depending on the tension applied respectively to the cover sheets. If the two respective cover sheets are made of two different materials respectively having different stretching or thermal yielding characteristics, or if the two cover sheets are of different sizes or are subjected to different degrees of molding on the opposite sides of the junction line, then these two cover sheets (and the underlying substrate) will apply different degrees of tension and will undergo differential slipping in the slip frame.

As a result, in practice, it has often been found that the junction line unintendedly slips laterally out of the pinching gap as the tucking blade pushes it down into the pinching gap. This phenomenon occurs particularly when the junction line or the molded contour along the junction line has a complex curvature or the like. In such a case, it has been found that the junction line will remain within the pinching gap (and thus within the finished pinched valley of the substrate) in some areas, while being shifted laterally out of the finished pinched valley of the substrate in other areas. The result is unsatisfactory, so that the affected pieces must be rejected.

To some extent, the above undesirable lateral slipping phenomenon can be avoided or compensated for by appropriately adjusting the clamping tension at different areas of the slip frame. However, any slight variations in the material characteristics of the two cover sheets, the process temperatures, the dimensions of the cover sheets, or the like, will again cause an unintended lateral slipping of the junction line relative to the valley in the substrate. It would be impractical and economically prohibitive to require mechanical readjustment or calibration of the slip frame tension on an ongoing or often-repeated basis.

In view of the above, the present invention provides an improved method and apparatus in comparison to the above referenced parent application, whereby this improved method and apparatus avoid the differential lateral slipping of the cover sheet materials relative to the intended junction line within the pinched valley of the substrate. This is achieved in general terms by positively holding the substrate and the two cover sheets directly along the junction line before and during the operation of pushing the cover sheet edges into the valley of the substrate and then pinching closed this valley. The present method and apparatus positively enforce the junction line of the two cover sheets to become a fixed reference line, relative to which all slipping or stretching will take place. By defining the fixed reference line along the junction line in this manner, the respectively required degree of slipping will take place at the various respective locations of the slip frame without allowing the junction line to shift laterally for compensating different tensions or the like. For this reason, it becomes possible to precisely position and pinch the junction line between two cover materials in a pinched valley of a substrate, even if this pinched valley of the substrate has a complex curved contour in two dimensions or three dimensions.

The improved method is carried out using an improved apparatus that includes the features of the original apparatus mentioned above, and additionally includes a counter-clamping blade in the lower mold section, which cooperates with the tucking blade of the upper mold section to clampingly hold the junction line of the two cover sheets therebetween. The counter-clamping blade is movably carried by piston rods or the like so that the counter-clamping blade can move up to meet the tucking blade with the substrate and cover sheets clampingly held therebetween, before any molding deformation of the substrate and cover sheets is carried out. Then the counter-clamping blade is retracted downwardly into the pinching gap of the lower mold section in unison as the tucking blade moves downwardly into the pinching gap. Thereafter, the pinching gap is closed while the tucking blade is retracted, generally in accordance with the original method.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

The original invention, which is the subject matter of the above referenced parent application Ser. No. 09/176,356, now U.S. Pat. No. 6,212,157, will first be described in connection with FIGS. 1 to 4. An understanding thereof is essential to an understanding of the present further improved method and apparatus of the present Continuation-In-Part application, because the present improved method and apparatus incorporate all of the features of the original invention, and further incorporate certain improvements, which will be additionally described in connection with FIGS. 5 to 10 below.

Figure 1:
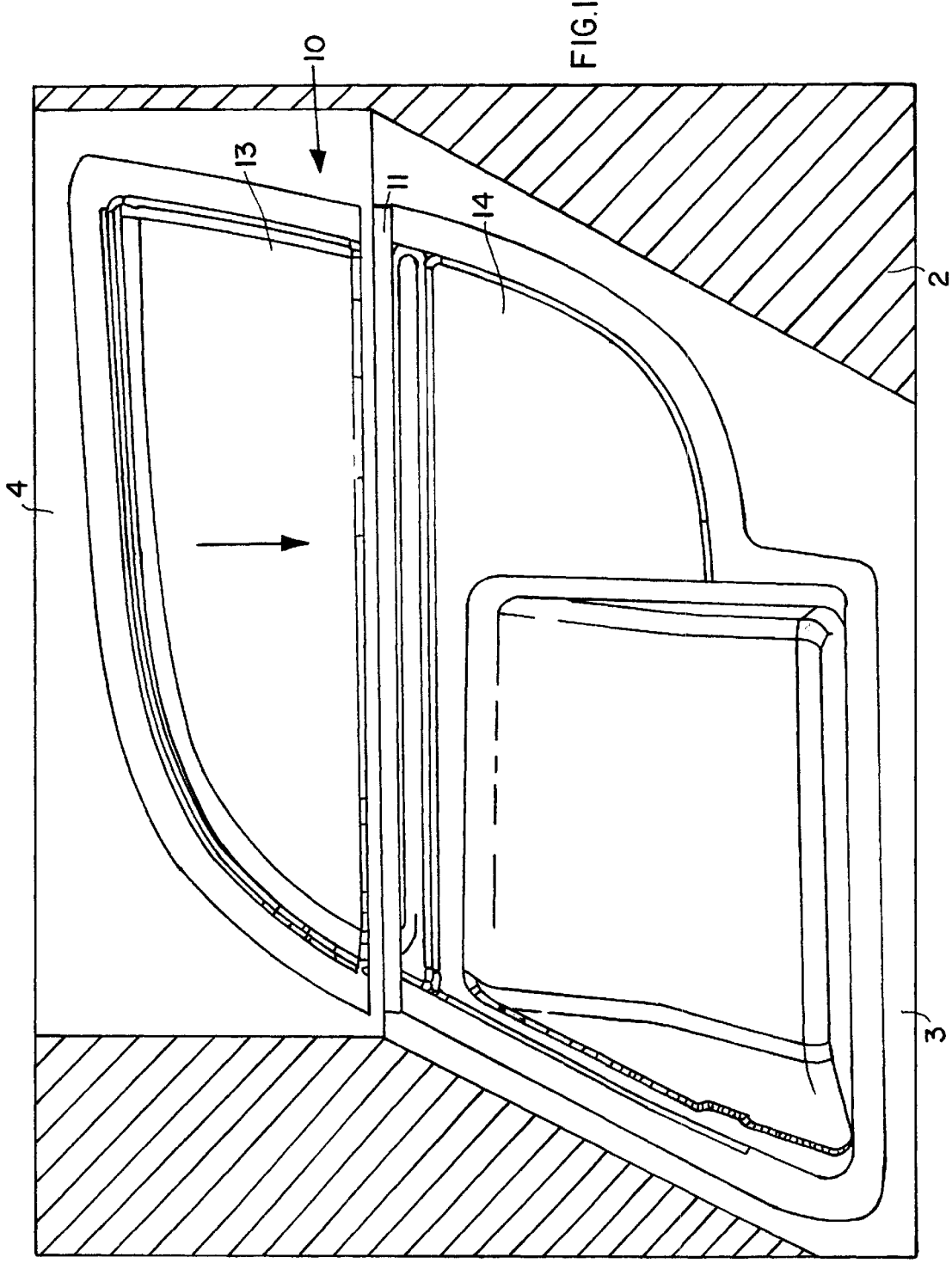
FIG. 1 is a schematic top plan view of a pre-laminated sheet including cover sheets adhered onto a substrate, superimposed on a plan view of the lower mold of an apparatus according to the original invention of the parent application.
Figure 4:
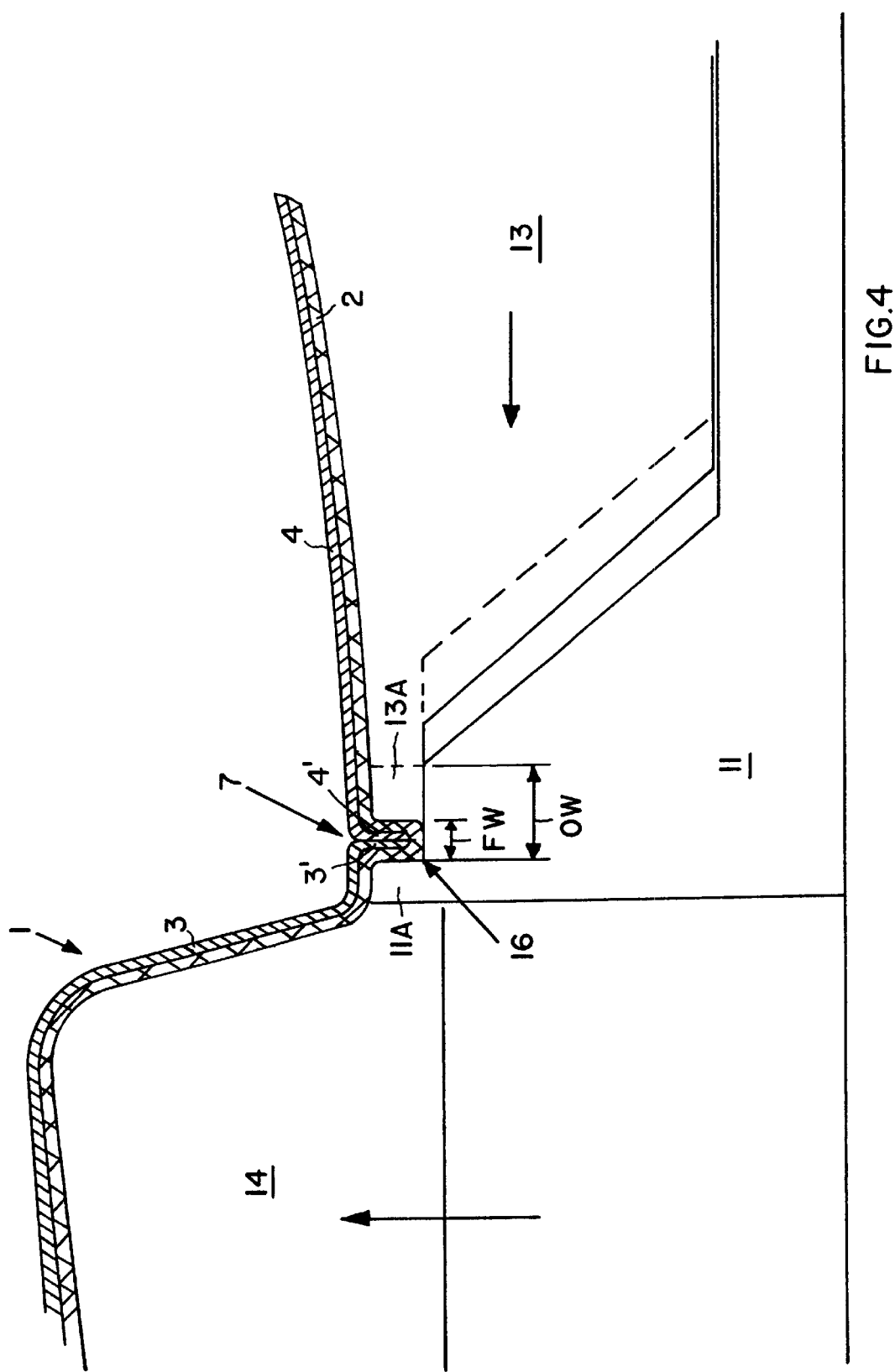
FIG. 4 is an enlarged detailed sectional view of a portion of FIG. 3, to illustrate the pinching area of the molding apparatus.

With reference to FIGS. 1 and 4, an example of a trim component 1 according to the invention is an interior door trim panel for an automobile, comprising a substrate 2 with two different cover sheets, namely a cover film 3 and a cover cloth 4, applied thereon. The two cover sheets, namely the film 3 and the cloth 4 are not pre-spliced together, but rather come together with their respective bordering edges 3' and 4' arranged butting together edge-to-edge at a junction area 7, which is received and pinched in a valley 6 formed in the substrate 2. The film 3 and the cloth 4 are directly adhesively bonded onto the substrate 2, without using any additional adhesive or the like. The cloth 4 is, for example, a synthetic woven fabric cloth which preferably includes a polyolefin. The film 3 is, for example, a thermoplastic polyolefin (TPO) film. The substrate 2 is preferably a substrate material comprising natural fibers such as kenaf plant fibers and a polyolefin matrix such as polypropylene. The substrate is most preferably a multi-layered substrate, whereby the different layers may have different compositions. The preferred polyolefin material of the cloth 4 and the film 3 is directly bonded onto the polypropylene of the substrate 2 by a hot-melt adhesive effect. Because of the pinched valley 6, there is no need for, and the trim component 1 does not include, any adhesive or stitching that connects together the bordering edges 3' and 4' of the cover film 3 and the cloth 4, or a splice trim strip applied over the junction area 7.

An example method and apparatus for producing the present trim component 1 will now be described with reference to FIGS. 1 to 4. In preliminary steps not shown in the drawings, the substrate sheet 2 is pre-heated and pre-compressed in a heating press, to the required density and to the required temperature for achieving a hot-melt adhesion onto the cover sheets as will be described below. The cover film 3 and the cover cloth 4 are separately laid onto the pre-heated and pre-compressed substrate sheet 2, whereby the hot-melt adhesive effect of the hot polypropylene of the substrate causes a tacky adhesive bonding of the film 3 and the cloth 4 onto the substrate sheet 2. In order to increase the adhesive bonding if necessary, the pre-laminate may again be pressed so as to firmly bond the cover sheets 3 and 4 onto the substrate 2. The two cover sheets 3, 4 are, for example, butted with a respective edge thereof against a thin (e.g. 1 mm) metal sheet as an alignment aid along the intended location of the joint line 7, and then the metal sheet is withdrawn in order to leave the sheets 3, 4 substantially butted against each other edge-to-edge along the joint line 7.

The resulting pre-laminated sheet is held around its edges by a slip frame 18, which then transports the pre-laminated sheet into position between a lower mold 10 and an upper mold 20. Since the two cover sheets 3 and 4 are already firmly fixed in position and bonded on the substrate 2, there is no need to provide a separate transport and positioning frame for the cover sheets 3 and 4. The position of the cover sheets 3 and 4 on the substrate 2 is fixed when the cover sheets 3 and 4 are laid and adhered onto the substrate 2. Thus, the proper registration of the cover sheets 3 and 4 on the substrate 2 is not subject to variations in the further processing of the prelaminated sheet. Namely, when the substrate 2 is properly positioned by the slip frame 18, the cover sheets 3 and 4 and the junction area 7 therebetween are necessarily also properly positioned, unless the substrate 2 and cover sheets 3 and 4 slip differentially in the slip frame 18 on opposite sides of the junction area 7. Such an undesired differential slipping phenomena can be avoided by the improved method and apparatus to be described below in connection with FIGS. 5 to 10.

FIG. 1 represents a schematic top view onto the lower mold 10 with the pre-laminated sheet of the cover film 3 and cloth 4 adhered onto the substrate sheet 2 superimposed thereon. In FIG. 1, the components of the lower mold 10 are shown in a ghost image below the prelaminated sheet for purposes of illustration.

Figure 2:
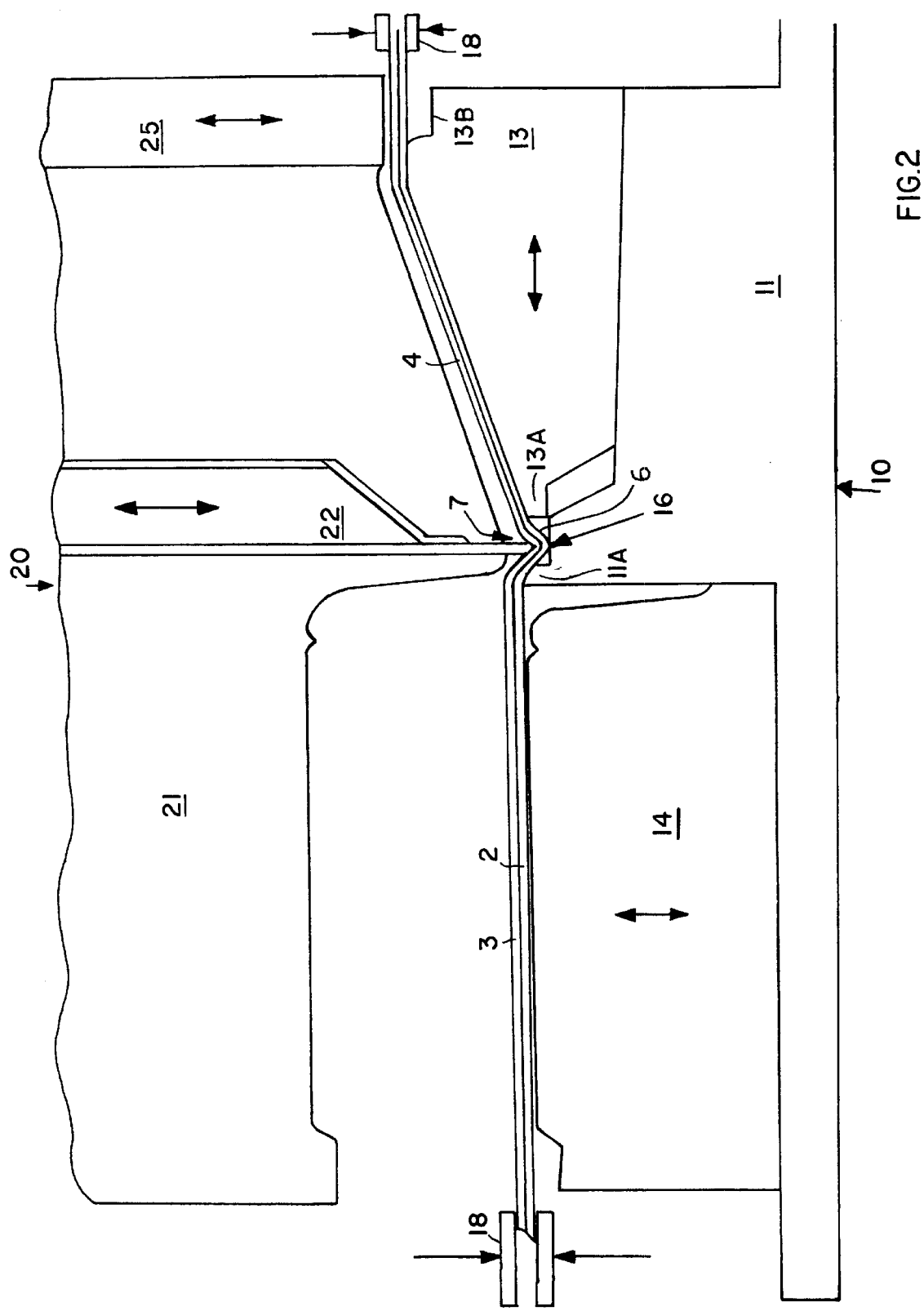
FIG. 2 is a sectional schematic side view of a molding apparatus according to the original invention, at a first stage of the molding process.

Referring to FIG. 2, the prelaminated sheet including the cover sheets 3 and 4 on the substrate 2 is held in position by the slip frame 18 between the lower mold 10 and the upper mold 20. As a first molding step, the upper mold 20 in general is moved down into position against the lower mold 10. In a first possible sequence of steps, the lower primary mold stamp 14 is first moved up against the upper primary mold stamp 21 so as to mold and form the major portion of the trim component including the cover film 3 between the two mold stamps 14 and 21, and thereafter the tucking blade 22 is operated as described below. In an alternative, preferred sequence of molding steps, however, the first molding contact or closed portion of the molding tools is formed by moving down the tucking blade 22 into a pinching gap 16 formed in the lower mold 10. By carrying out this step first, the proper location and holding of the junction area 7 of the cover film 3 and the cover cloth 4 into the pinching gap 16 is assisted, without being affected by any tension applied to the prelaminated sheet by the molding operation carried out between the lower primary mold stamp 14 and the upper primary mold stamp 21.

The lower mold 10 includes a fixed tool segment 11 having a protruding edge or rim 11A, and a pinching stamp 13 having a protruding edge or rim 13A that is horizontally movable relative to the fixed tool segment 11. The pinching gap 16 is formed between the protruding edge 11A of the fixed tool segment 11 and the protruding edge 13A of the pinching stamp 13. Initially as shown in FIG. 2, the pinching gap 16 has a relatively wide width, i.e. this gap 16 is opened, because the horizontally movable pinching stamp 13 is initially retracted toward the right and has not yet been driven toward the left. Thus, when the tucking blade 22 presses the junction area 7 of the pre-laminated sheet down into the pinching gap 16 and correspondingly forms the valley 6 in the substrate, there is initially a rather wide play area or tolerance range within which it is still ensured that the junction 7 itself of the film 3 and the cloth 4 will be received in the valley 6 within the pinching gap 16. For this reason, the slip frame 18 does not need to transport and hold the pre-laminated sheet with extreme precision, but merely with sufficient precision to locate the junction 7 over the wide open pinching gap 16.

Figure 3:
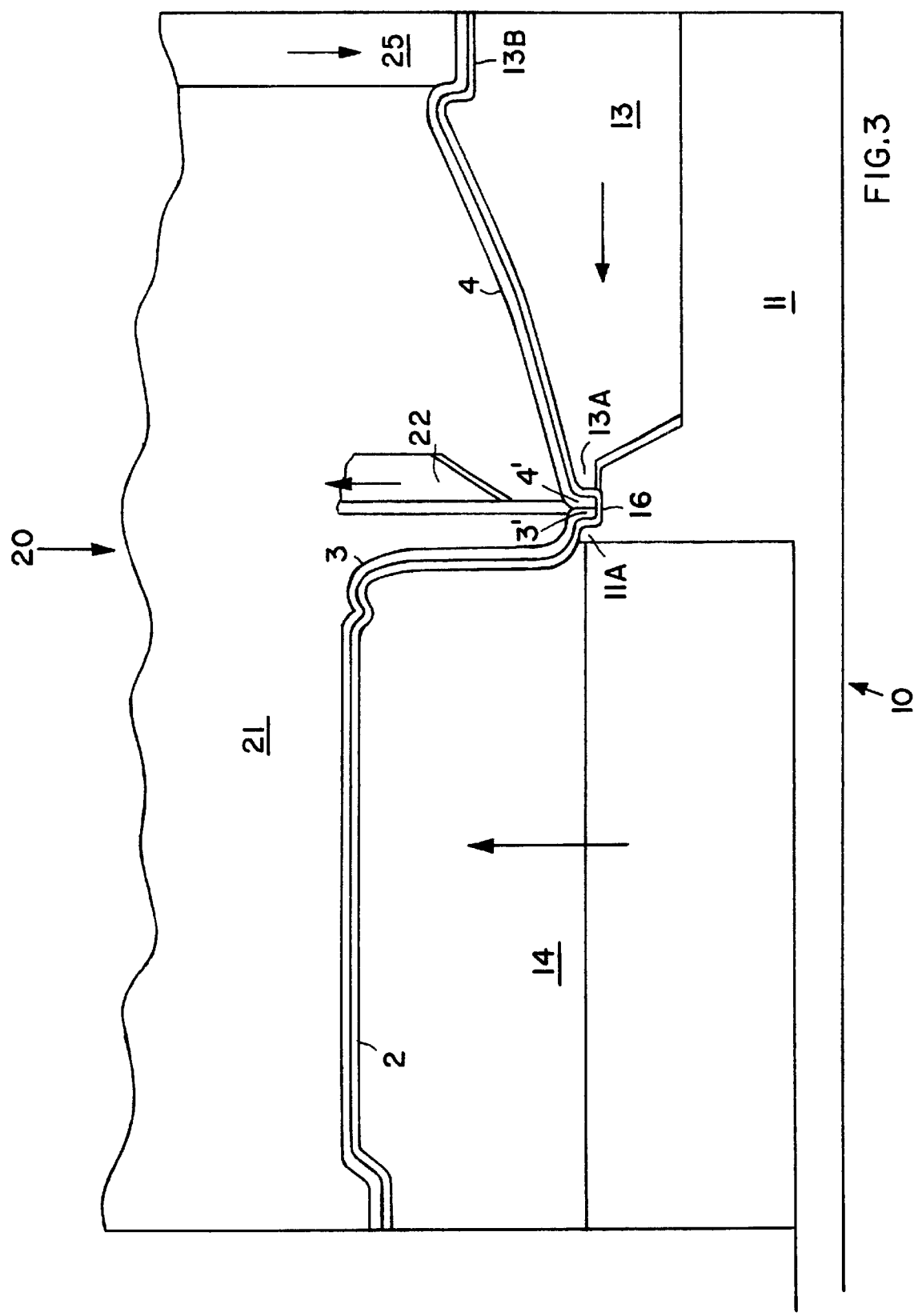
FIG. 3 is a view similar to that of FIG. 2, but showing the molding apparatus in a subsequent stage of the molding process.

FIG. 3 shows a subsequent stage of the molding process. The pinching stamp 13 has been pressed toward the left so as to close the pinching gap 16, i.e. so as to pinch the valley 6 of the substrate 2 closed around the junction area 7, between the protruding edge 13A of the pinching stamp 13 and the protruding edge 11A of the fixed tool segment 11. As the pinching stamp 13 progresses toward the left, the tucking blade 22 is retracted upward, and the pinching stamp 13 completes its pinching motion toward the left after the blade 22 has been fully retracted. As a result, it is possible to completely pinch closed the valley 6 in the substrate 2, with the bordering edges 3' and 4' of the film 3 and the cloth 4 pinched tightly into the closed valley 6, between the protruding edge 13A and the protruding edge 11A.

Once the pinching operation by the pinching stamp 13 has been completed or substantially completed, the lower mold stamp, 14 is pressed upward against the upper mold stamp 21, while the upper mold stamp 21 simultaneously presses downward against the pinching stamp 13. In this manner, the portion of the trim component 1 provided with the cover film 3 is molded and laminated between the lower mold stamp 14 and the upper mold stamp 21, while the portion of the trim component 1 provided with the cover cloth 4 is molded and laminated between the upper mold stamp 21 and the pinching stamp 13. At this stage also, the edge crimping ring is moved downward, so as to crimp the outer perimeter edge of the trim component 1 between the crimping ring 25 and the outer rim 13B of the pinching stamp 13.

As seen in FIG. 3 and in the detail view of FIG. 4, the upper surface contour of the lower mold stamp 14, the fixed tool segment 11 and the pinching stamp 13 forming the lower mold 10 substantially corresponds to the bottom surface contour of the upper mold stamp 21 and the edge crimping ring 25. This surface contour between the lower mold 10 and the upper mold 20 also defines the contour of the finished trim component 1.

In the detail view of FIG. 4, the pinching stamp 13 is shown in its left-most pinching position with solid lines, and is shown in its right-most open position with dashed lines. The closed or pinched valley 6 in the substrate 2 is also clearly evident, with the junction 7 of the bordering edges 3' and 4' of the cover film 3 and the cloth 4 received completely within the groove or valley 6. As can be seen in the illustration, the finished junction area 7 is a clean or crisp transition between the cover film 3 and the cloth 4, without a gap, opening, or necessity of providing a trim strip therebetween. Thus, the finished width FW of the pinched valley 6 is much less than the open width OW of the pinching gap 16 formed between the protruding edge 13A of the pinching stamp 13 and the protruding edge 11A of the fixed tool segment 11 when the pinching stamp 13 is in its initial right-hand position. As explained above, it is the open width OW of the pinching gap 16, as well as the depth of the gap, that defines the tolerance range within which the junction 7 may be positioned for reliably receiving and enclosing the junction 7 in the finished pinched valley 6.

Once the molding apparatus is in the state shown in FIGS. 3 and 4, this state is maintained for a brief cooling time, for which the molds are preferably liquid-cooled. This preliminary cooling rigidifies the substrate 2 sufficiently to hold and maintain the pinched form of the valley 6 with the junction 7 therein, after the mold is opened as follows. To open the mold, the edge crimping ring 25 is retracted upward, and the upper and lower primary to mold stamps 21 and 14 are moved back to their initial positions, while the pinching mold 13 is moved back to the right after its motion is no longer blocked by the engagement of the edge crimping ring 25. Once the mold is open, the molded trim component can be removed and allowed to completely cool. The cooling rigidifies the substrate 2 so as to hold the tightly pinched form of the valley 6, and to make the overall component 1 form-stable, i.e. sufficiently rigid to maintain the molded configuration thereof.

Now the improved method and apparatus of the present Continuation-In-Part application will be described with reference to FIGS. 5 to 10. Most of the components and features in connection with FIGS. 5 to 10 are the same as those described above in connection with FIGS. 1 to 4, and the same elements are labelled with the same reference numbers throughout the drawings. Also, a redundant description of the components and the steps of the method will be omitted, while only the special differences or improvements of the present method and apparatus will be high-lighted in comparison to the above discussion.

Figure 5:
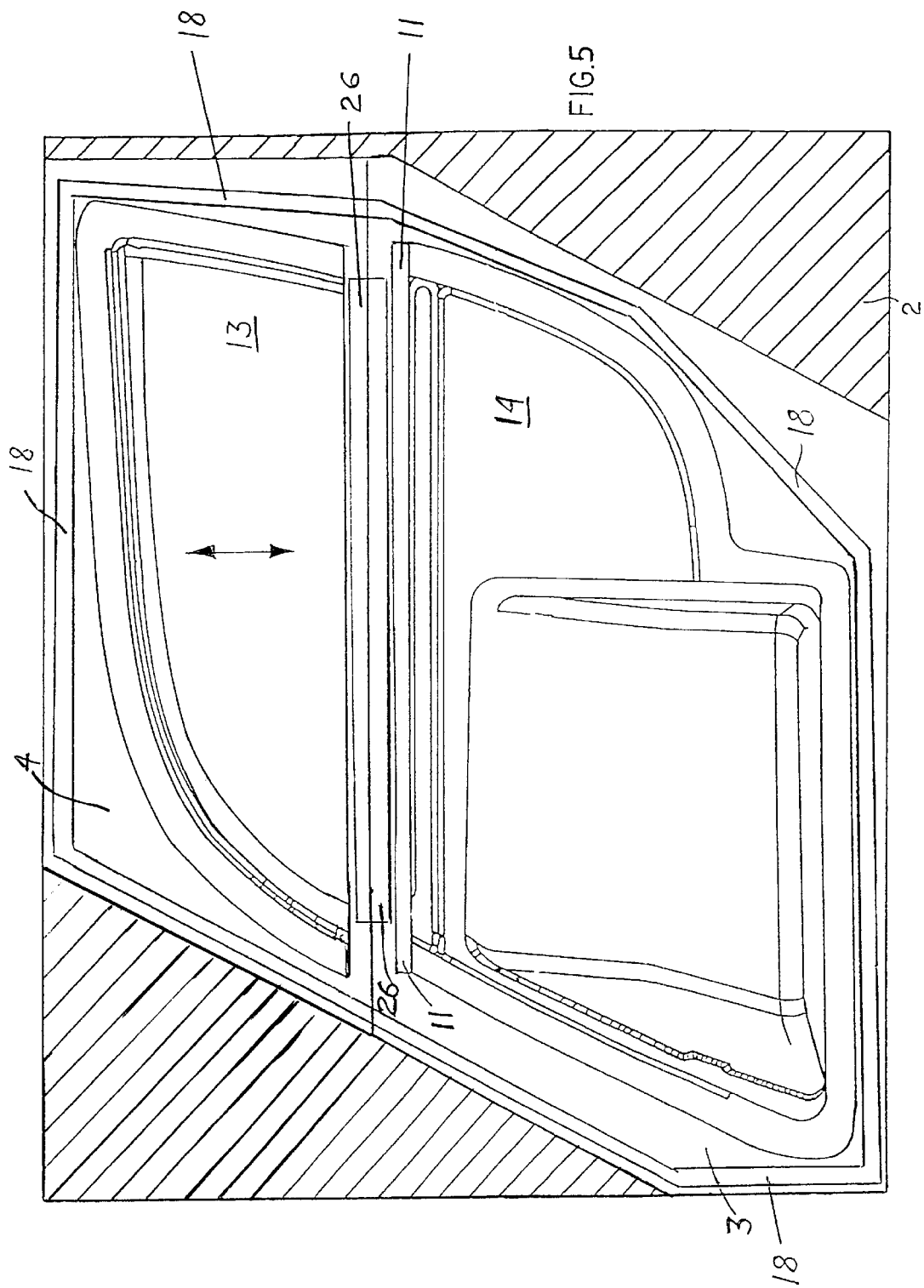
FIG. 5 is a schematic top plan view generally corresponding to FIG. 1, but additionally showing a slip frame for holding the perimeter and a counter-clamping blade for holding the joint line of the two cover sheets according to the improved invention of the present Continuation-In-Part application.

FIG. 5 generally corresponds to FIG. 1, except that it additionally shows the slip frame 18, which has been described above, and the counter-clamping blade 26 that is a part of the lower mold 10 in the improved inventive apparatus.

Figure 6:
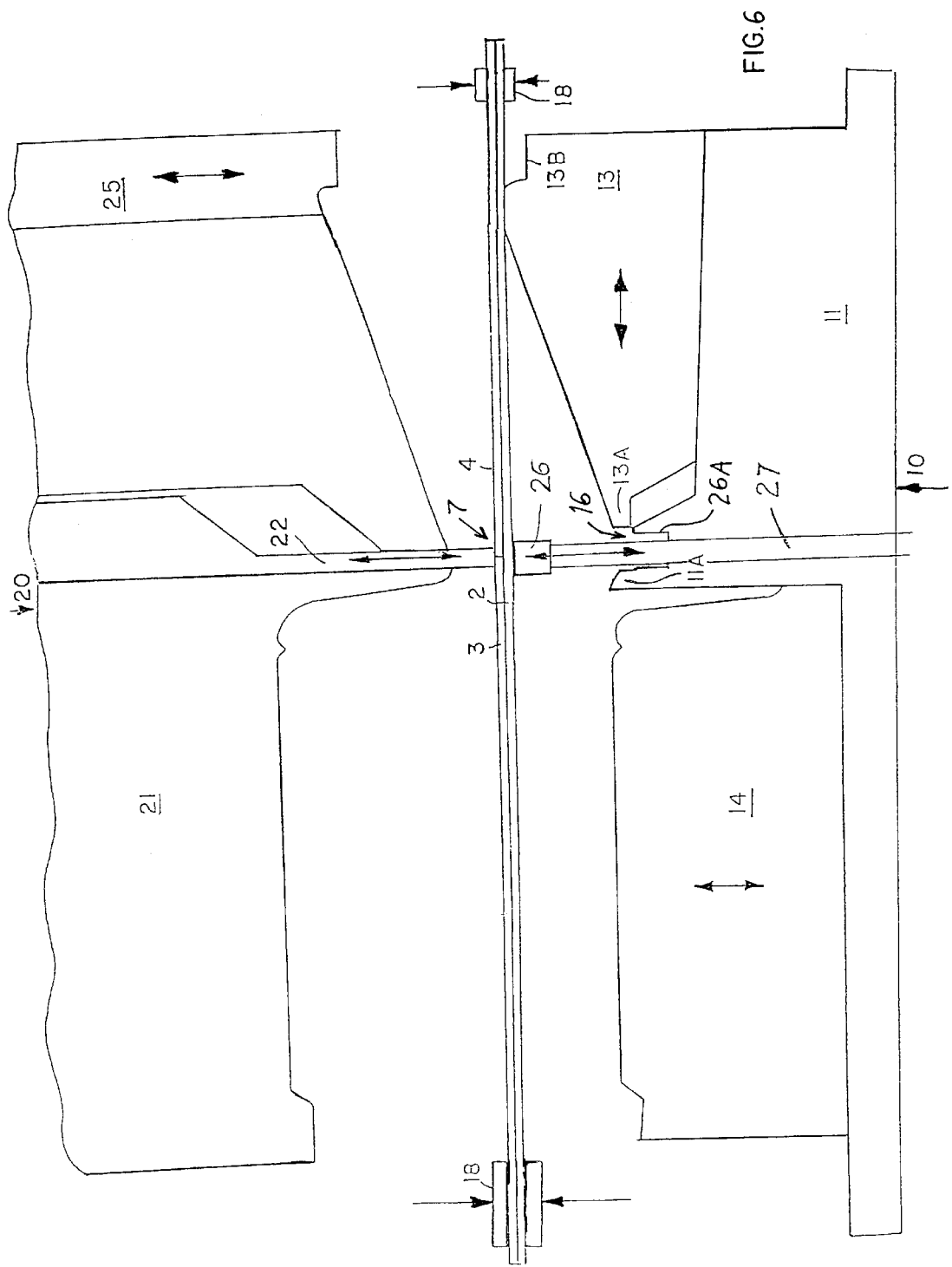
FIG. 6 is a sectional schematic side view of a molding apparatus according to the improved invention of the present CIP application, at a first stage of the molding process involving clamping the substrate and cover sheets along the junction line
Figure 7:
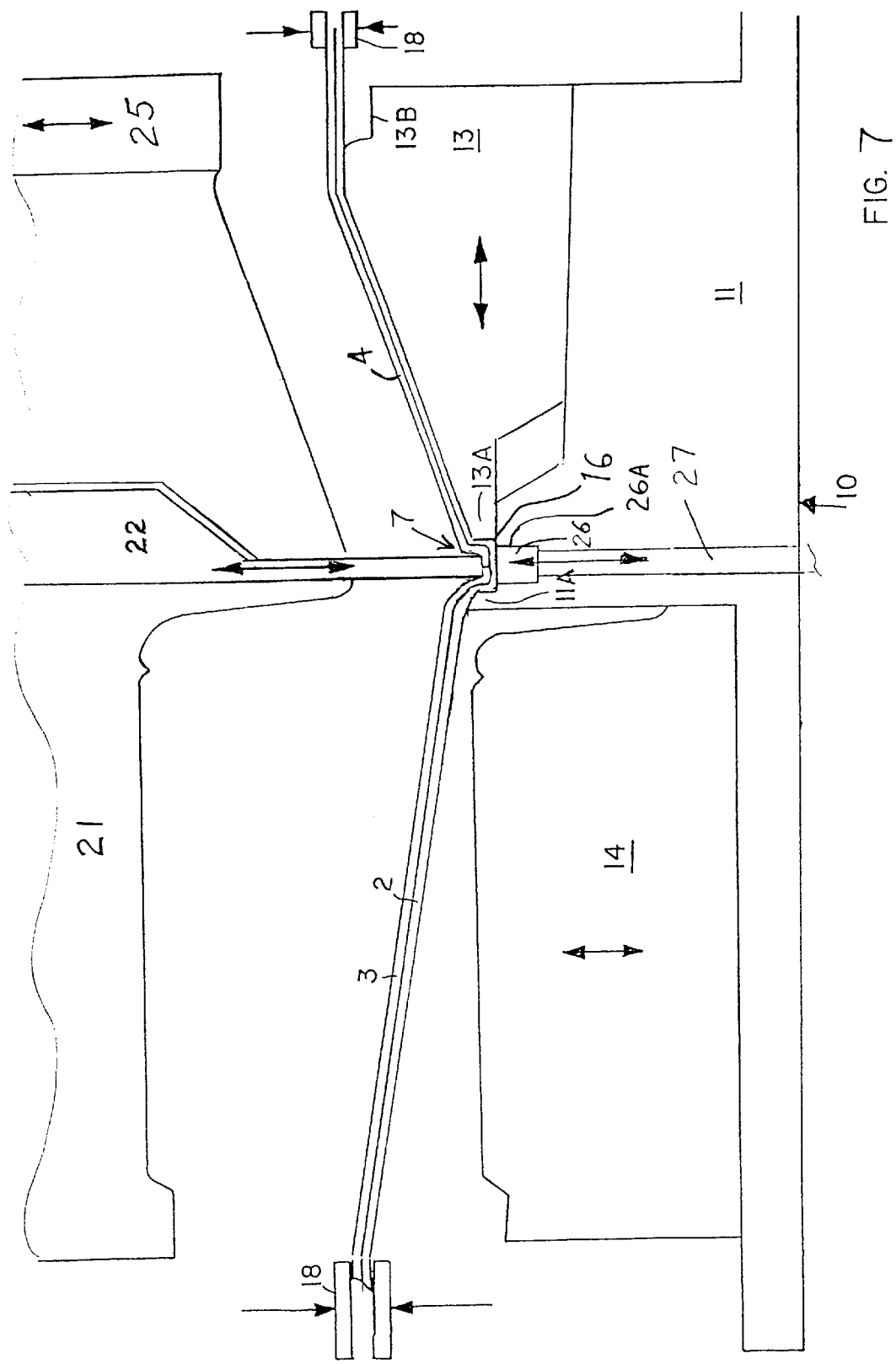
FIG. 7 is a view similar to that of FIG. 6, but showing the molding apparatus in a subsequent stage of the molding process, in which the substrate and cover sheets are still held along the junction line, and have been moved into the pinching gap.

FIG. 6 generally corresponds to above described FIG. 2, but at an earlier stage of the molding process, using the present improved process and apparatus. As shown in FIG. 6, the lower mold 10 further includes a counter-clamping blade 26 that extends along the length of the intended junction 7 between the film 3 and cloth 4 representing two different cover sheets, as shown in FIG. 5. The counter-clamping blade 26 is movably supported, for example by two piston rods 27 at the respective opposite ends of it the counter-clamping blade 26. Piston rods 27 may be actuated by pneumatic cylinders or hydraulic cylinders or mechanical drives, in order to raise and lower the counter-clamping blade 26 as will be described below. As further shown in FIG. 6, the fixed tool segment 11 includes a recessed trough 26A into which the counter-clamping blade 26 may be retracted as shown in FIG. 7. However, in the position or step of FIG. 6, the counter-clamping blade 26 has been raised upwardly by the piston rods 27 so that the counter-clamping blade 26 substantially meets and cooperates with the leading edge of the tucking blade 22, so as to clamp the junction area 7 of the prelaminated sheet 2, 3, 4 between the counter-clamping blade 26 and the tucking blade 22, at the intersection of the horizontal plane in which the prelaminated sheet is supported in the slip frame 18 and the vertical plane of the pinching gap 16.

As the very first step of the improved molding process, the junction area 7 of the prelaminated sheet 2, 3, 4 is tightly clamped and secured between the counter-clamping blade 26 and the tucking blade 22. This serves to positively locate and fix the junction area 7 at the proper position with respect to the pinching gap 16 of the lower mold. This further ensures that the prelaminated sheet 2, 3, 4 cannot slide or slip laterally away from the proper alignment with the pinching gap 16, regardless of any differential tension or stretching that might affect the prelaminated sheet on opposite sides of the junction area 7. Thus, any compensating slippage will necessarily occur at the slip frame 18, to accommodate any differential tension or stretching while the prelaminated sheet is being molded in subsequent steps, with the junction area 7 precisely and positively clamped at the pinching gap 16.

In the stage of the process shown in FIG. 7, the tucking blade 22 and the counter-clamping blade 26 have together moved down in unison while maintaining the clamping of the junction area 7. Thereby, the junction area 7 has been precisely tucked down into the pinching gap 16, with a positively ensured proper alignment of the junction 7 all along the pinching gap 16, even if this pinching gap and the junction 7 extend along a complexly curved contour in two dimensions or three dimensions. The counter-clamping blade 26 has been retracted downwardly into the recessed trough 26A in the fixed tool segment 11, between the protruding edge 11A of the fixed tool segment 11 and the protruding edge 13A of the pinching stamp 13. Thereby, the side walls of the protruding edges 11A and 13A together with the top surface of the counter-clamping blade 26 bound and form the pinching gap 16 therebetween.

Figure 8:
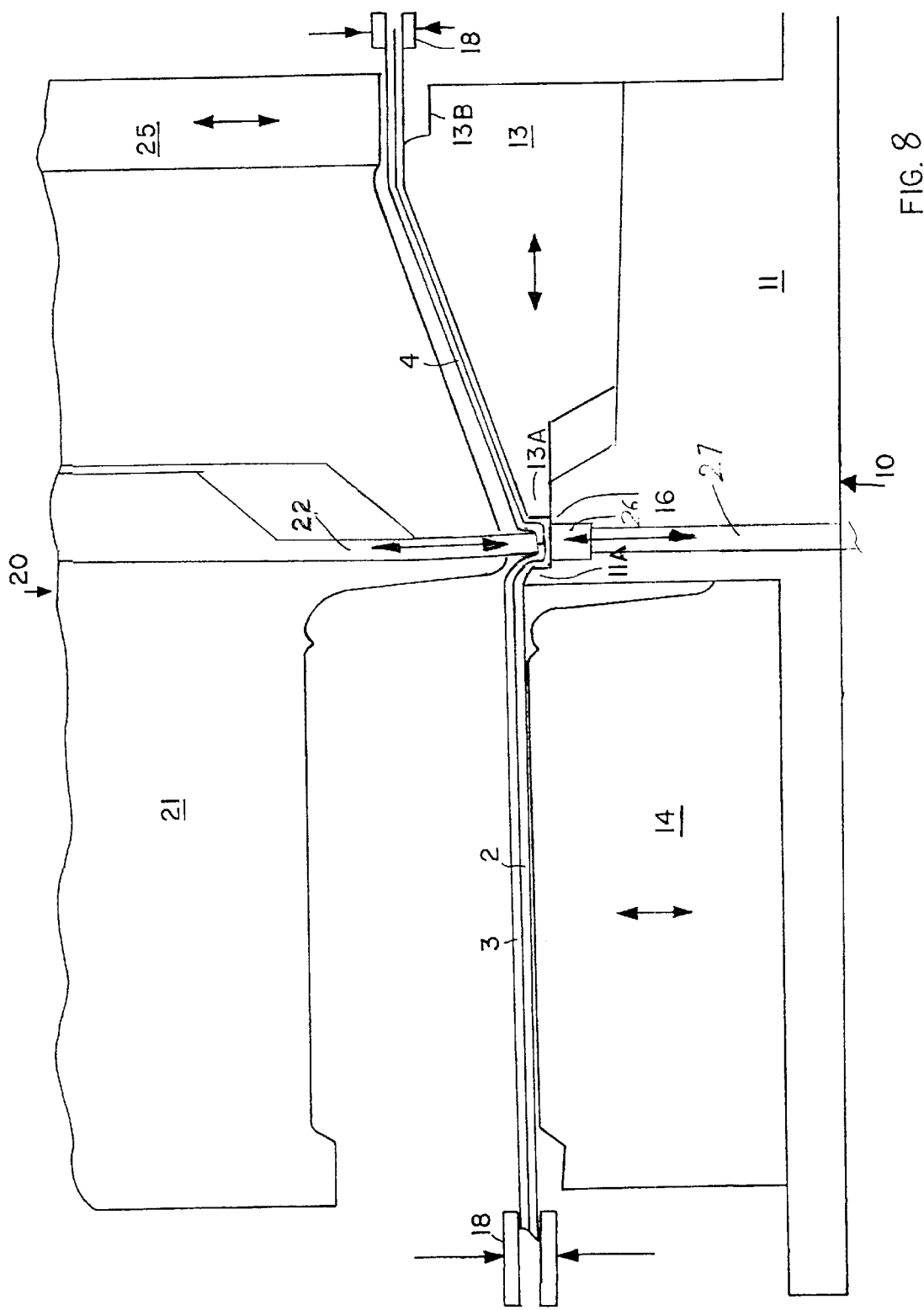
FIG. 8 is a view similar to that of FIG. 7, but showing the molding apparatus in a further subsequent stage of the molding process, in which the upper mold section has begun to move down and the slip frame has moved down.

FIG. 8 shows a next stage in the process, wherein the upper mold stamp 21 has moved downwardly toward the lower mold stamp 14 and the fixed base tool segment 11 of the lower mold 10. The tucking blade 22 has maintained its position relative to the counter-clamping blade 26 and the pinching gap 16 while being relatively retracted with respect to the upper mold stamp 21. In other words, the upper mold stamp 21 has moved downwardly (together with the crimping ring 25), independently of the tucking blade 22 which remains stationary and clamped against the counter-clamping blade 26. This ensures that the junction area 7 remains continuously and properly clamped in the pinching gap 16.

Also in this step, the slip frame 18 has moved downwardly together with the upper mold stamp 21, to lay the substrate 2 of the prelaminated sheet 2, 3, 4 onto the upper surface of the lower mold stamp 14 and also onto the upper surface of the pinching stamp 13, to the extent applicable. In this manner, wrinkling and uneven stretching of the prelaminated sheet can be avoided in the subsequent molding step.

Figure 9:
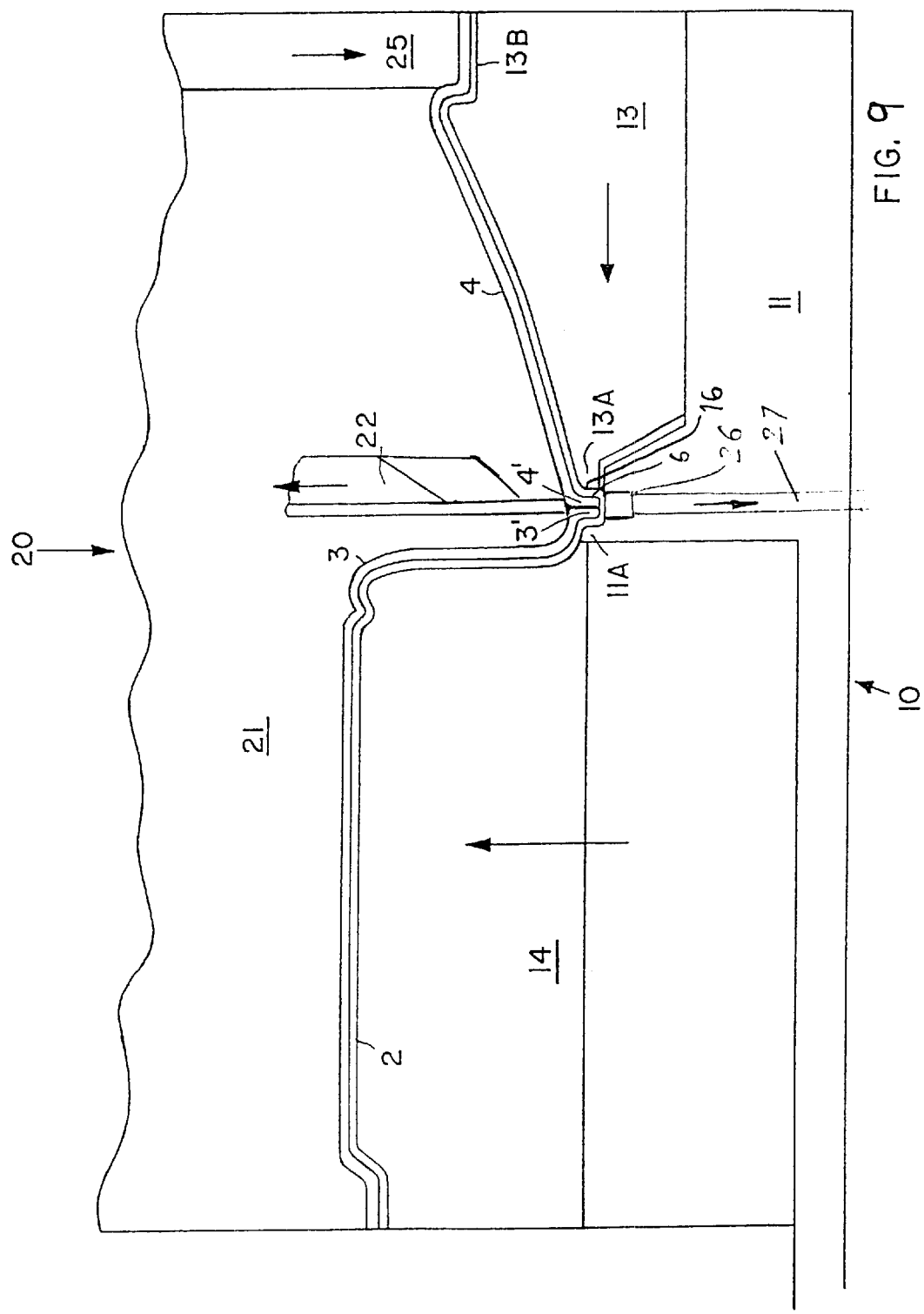
FIG. 9 is a view similar to that of FIG. 8, but showing the molding apparatus in a still further subsequent step of the molding process, in which the tucking blade has been retracted, the pinching gap has been closed, and the mold has been closed.

In the transition from FIG. 8 to FIG. 9, the upper mold 20, including the upper mold stamp 21 and the crimping ring 25, has been moved downwardly while the lower mold stamp 14 is pushed upwardly and the pinching stamp 13 is pushed to the left, so as to mold the prelaminated sheet 2, 3, 4 between the mating surfaces of the upper mold stamp 21 and the lower mold stamp 14, and the mating surfaces of the upper mold stamp 21 and the pinching stamp 13. Substantially simultaneously as the pinching stamp 13 is pushed to the left, the tucking blade 22 is retracted upwardly, so that the protruding edge 13A of the pinching stamp 13 pinches closed the valley 6 of the substrate 2, with the bordering edges 3' and 4' of the film 3 and the cloth 4 pinched tightly back-to-back in the closed valley 6.

The clamping and holding of the junction area 7 between the counter clamping blade 26 and the tucking blade 22 has been maintained until the very last moment before the pinching gap 16 between the protruding edges 11A and 13A is closed so as to pinch closed the groove or valley 6 of the substrate 2. This ensures that the junction area 7 will be precisely aligned in the pinched-closed valley 6. Any stretching or pulling of the substrate 2 and the cover sheets 3 and 4 during the molding process is compensated by a corresponding degree of slipping of the prelaminated sheet 2, 3, 4 in the slip frame 18 at the edges of the molding equipment on opposite sides of the junction area 7, while the junction area 7 itself is precisely and exactly clampingly held in the pinching gap 16 as described above. Once the pinching stamp 13 has been moved to the left, the crimping ring 25 moves down so as to crimp the outer perimeter edge of the trim component 1 between the crimping ring 25 and the outer rim 13B of the pinching stamp 13.

Figure 10:
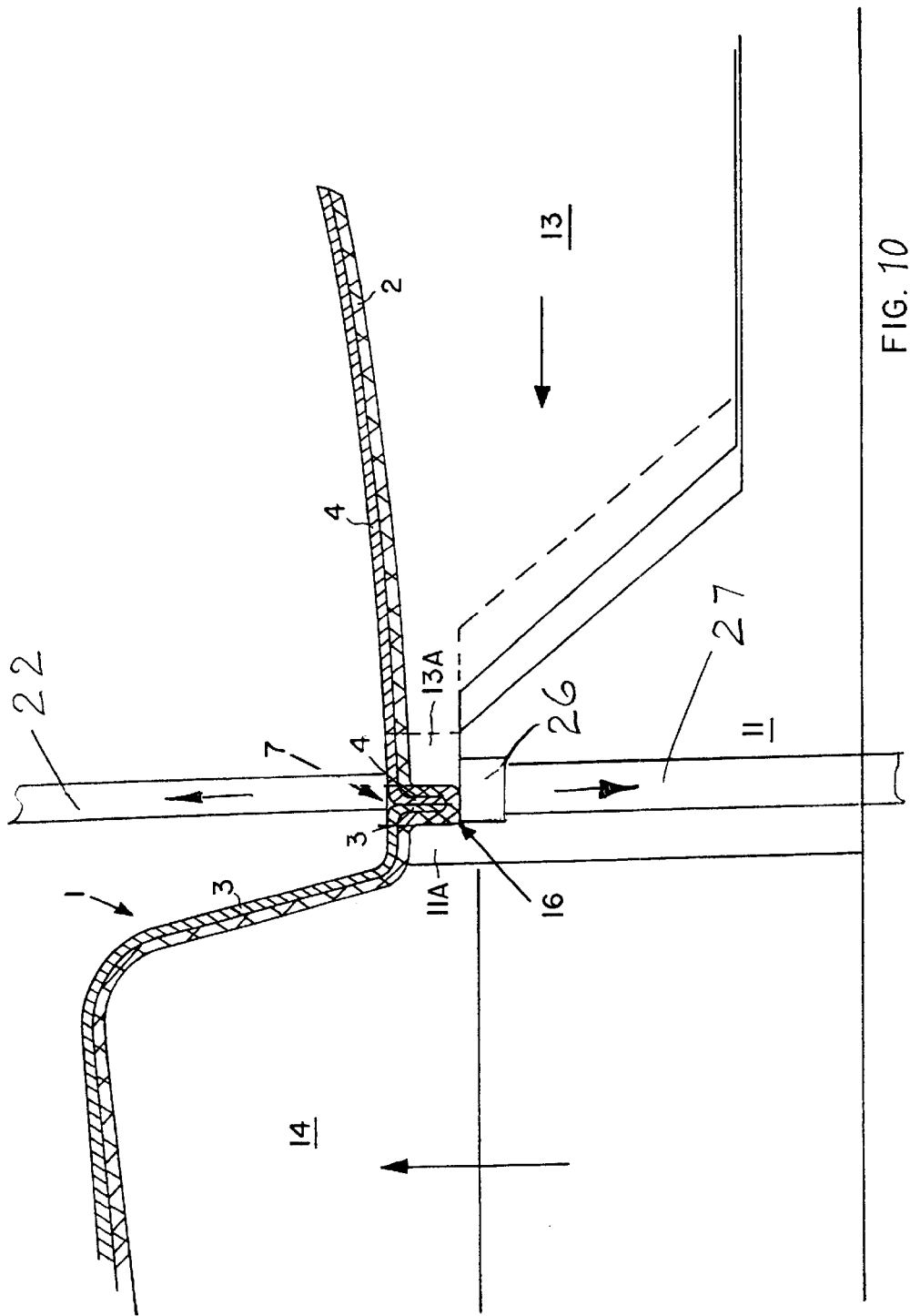
FIG. 10 is an enlarged detailed sectional view of a portion of FIG. 9, to illustrate the pinching area of the molding apparatus.

The enlarged detail view of FIG. 10 corresponds to that of FIG. 4 described above, except that it additionally illustrates the arrangement of the counter-clamping blade 26 supported on one or more piston rods 27 or the like, arranged in the fixed tool segment 11 of the lower mold. The completion of the molding process and opening of the mold corresponds to the original method described above.

It should be understood that the actuation motion of the tucking blade 22 and of the piston rods 27 or the like driving the counter-clamping blade 26 can be controlled by appropriately regulating the pneumatic or hydraulic pressure applied to the cylinders or other actuators for driving these components. For example, by setting a regulating valve to a specified pressure, the position of the counter-clamping blade 26 will be maintained up to a prescribed clamping force, but when a greater force is exerted thereagainst (e.g. by the tucking blade 22 moving downward with a greater driving pressure against the counter-clamping, blade 26), then the pistons 27 supporting the counter clamping blade 26 will automatically retract while maintaining the specified counter-holding pressure and bleeding-off pressure medium above the regulated pressure. In this manner, the tucking blade 22 and the counter-clamping blade 26 can easily be caused to move in unison while maintaining a specified clamping force on the junction area 7. Similar considerations apply to the movement of the upper mold stamp 21 and the tucking blade 22 relative to each other.

The inventive trim components can be used in motor vehicles in the broadest sense, for example including automobiles, trucks, railroad cars, aircraft, recreational vehicles, and boats, and also in numerous other applications, such as in mobile homes and pre-manufactured housing. Although the invention has be en described with reference to specific example embodiments, it will be appreciated that it is intended to cover all modifications and equivalents within the scope of the appended claims. It should also be understood that the present disclosure includes all possible combinations of any individual features recited in any of the appended claims. While the pinching motion of the pinching stamp 13 is illustrated as being substantially perpendicular to the gross motion of the upper mold 20 and the lower mold 10, the pinching stamp 13 could alternatively move at an oblique angle, or generally at an angle in a range from 45° to 135° relative to the gross mold motion direction, for example to achieve different pinching effects.

What is claimed is:

1. An apparatus for molding a trim component, said apparatus comprising a first mold section and a second mold section that are relatively movable in a first direction for molding the trim component therebetween, wherein said first mold section includes a base tool segment with a first rim, and a pinching stamp that is movable relative to said base tool segment in a second direction at an angle relative to said first direction and that includes a second rim opposed to said first rim with a pinching gap formed therebetween, such that said pinching gap has a variable gap width responsive to movement of said pinching stamp in said second direction relative to said base tool segment, wherein said second mold section includes a tucking blade that is movable in said first direction on a plane extending through said pinching gap, such that said tucking blade can be moved into and withdrawn from said pinching gap, and wherein said first mold section further includes a counter-clamping blade that is movable relative to said base tool segment and relative to said pinching stamp in said first direction on said plane extending through said pinching gap, such that said counter-clamping blade cooperates with said tucking blade to clampingly hold the trim component therebetween while moving together into said pinching gap.

2. The apparatus according to claim 1, wherein said first mold section further includes a first mold stamp that is movable in said first direction relative to said base tool segment and said second mold section, wherein said second mold section further includes a second mold stamp and an edge crimping stamp, and wherein said edge crimping stamp is movable in said first direction relative to said second mold stamp and said first mold section and is aligned to cooperate with an edge rim of said pinching stamp to compress an edge of the trim component therebetween.

3. The apparatus according to claim 1, wherein said base tool segment has a recess trough therein adjacent to and along said first rim at a bottom of said pinching gap, and wherein said recess trough and said counter-clamping blade are each respectively dimensioned and configured so that said counter-clamping blade can be recessed flushly into said recess trough along said bottom of said pinching gap.

4. The apparatus according to claim 3, further comprising at least one actuator rod connected to and movably carrying said counter-clamping blade, so as to selectively retract said counter-clamping blade into said recess trough and selectively extend said counter-clamping blade to protrude out of said pinching gap.

5. The apparatus according to claim 1, wherein said angle of said second direction relative to said first direction is a perpendicular angle.

6. The apparatus according to claim 1, wherein said first rim is immovably fixed relative to said base tool segment.

7. The apparatus according to claim 1, further comprising a slip frame arranged at a perimeter edge of said first and second mold sections and adapted to clampingly hold the trim component while allowing slipping of the trim component dependent on tension thereof.

8. A method of operating the apparatus according to claim 1, comprising the following steps:
   a) positioning a sheet to be molded for forming the trim component between said first and second mold sections;
   b) relatively moving said tucking blade and said counter-clamping blade toward each other in said first direction so as to clampingly engage and hold said sheet between said tucking blade and said counter-clamping blade;
   c) moving said tucking blade and said counter-clamping blade together in unison in said first direction so as to tuck said sheet into said pinching gap while still clampingly engaging and holding said sheet; and
   d) moving said pinching stamp in said second direction so as to reduce said variable gap width of said pinching gap between said first and second rims, while simultaneously withdrawing said tucking blade away from said counter-clamping blade and out of said pinching gap in said first direction, to form a valley and pinch closed said valley in said sheet.

9. The method according to claim 8, wherein said first mold section further includes a first mold stamp that is movable in said first direction relative to said base tool segment and said second mold section, said second mold section further includes a second mold stamp and an edge crimping stamp, and said edge crimping stamp is movable in said first direction relative to said second mold stamp and said first mold section and is aligned to cooperate with an edge rim of said pinching stamp to compress an edge of the trim component therebetween, said method further comprising, after said step d):
   e) moving said first and second mold stamps relatively toward each other so as to mold said sheet therebetween;
   f) moving said edge crimping stamp toward said edge rim of said pinching stamp to compress an edge of said sheet therebetween;
   g) retracting said edge crimping stamp and said first and second mold stamps; and
   h) retracting said pinching stamp.

10. The method according to claim 8, wherein said sheet includes a substrate and two separate cover sheets, said method further comprising a preliminary step of placing and surfacially bonding said two cover sheets onto said substrate with two respective edges of said cover sheets butted together edge-to-edge along a joint line, and wherein said steps a), b), c) and d) are carried out so that said tucking blade and said counter-clamping blade clampingly engage and hold said sheet directly along said joint line and so that said joint line is located entirely in said pinched closed valley upon completion of said step d).

11. The method according to claim 10, wherein said apparatus further comprises a slip frame arranged at a perimeter edge of said first and second mold sections and adapted to clampingly hold the trim component while allowing slipping of the trim component dependent on tension thereof, said method further comprising slipping said sheet in said slip frame respectively differently on opposite sides of said joint line.

* * * * *

UNITED STATES PATENT AND TRADEMARK OFFICE
CERTIFICATE OF CORRECTION

PATENT NO.    : 6,524,510 B2
DATED         : February 25, 2003
INVENTOR(S)   : Spengler It is certified that error appears in the above-identified patent and that said Letters Patent is hereby corrected as shown below:

<u>Title page,</u>
Item [56], References Cited, U.S. PATENT DOCUMENTS, replace "Frank et al." by -- Franck et al. --.

<u>Column 3,</u>
Line 11, before "of" replace "Pat. No. 6,124,157," by -- Pat. No. 6,214,157, --.

<u>Column 4,</u>
Line 5, after "cover", delete "an".

<u>Column 6,</u>
Line 43, after "now", replace "U.S. Pat. No. 6,212,157," by -- U. S. Pat. No. 6,214,157, --.

Signed and Sealed this

Twenty-fourth Day of June, 2003

JAMES E. ROGAN
*Director of the United States Patent and Trademark Office*